Aug. 10, 1965   J. J. FESCO   3,199,275
CONICAL FILTER
Filed Feb. 27, 1962
FIG. 1
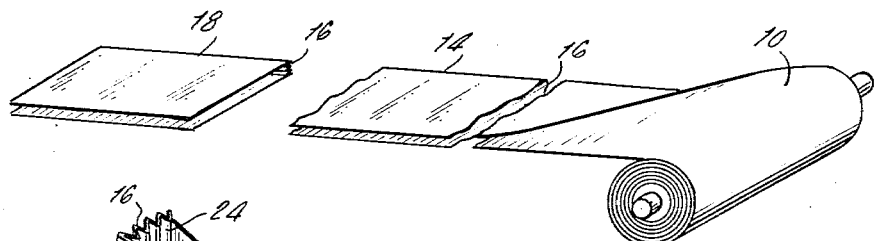
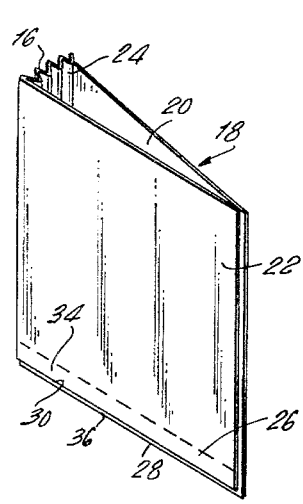
FIG. 2
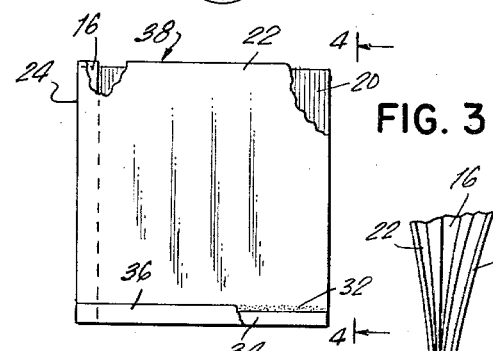
FIG. 3
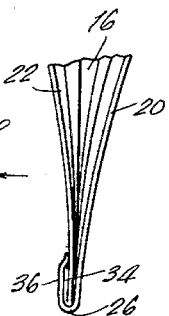
FIG. 4
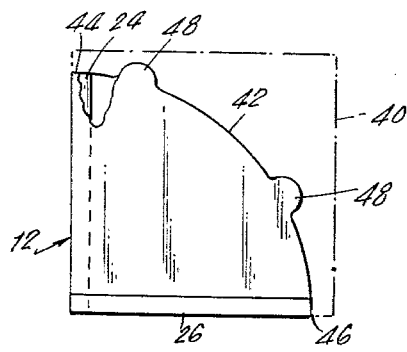
FIG. 5
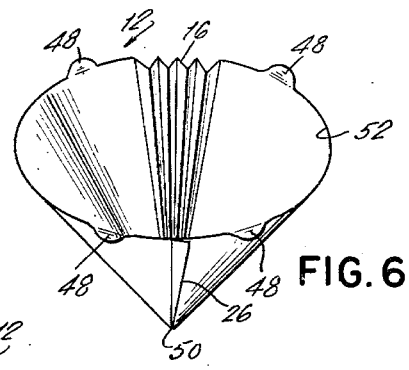
FIG. 6
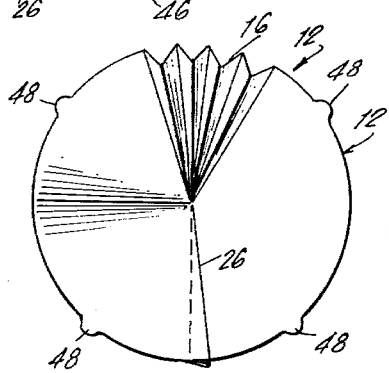
FIG. 7
INVENTOR.
JOHN J. FESCO
BY
Friedman & Goodman
ATTORNEYS

United States Patent Office 3,199,275
Patented Aug. 10, 1965

3,199,275
CONICAL FILTER
John J. Fesco, Baldwin, N.Y., assignor to Studley Paper
Company, Inc., a corporation of New York
Filed Feb. 27, 1962, Ser. No. 176,053
2 Claims. (Cl. 55—521)

The present invention relates generally to disposable filters for use in vacuum or suction cleaners and more specifically to conical paper filters therefore.

Heretofore, in the manfacture of conical paper filters of the type which the present invention relates, it was first necessary to stamp out from suitable paper sheet material a generally circular blank of said sheet material for each conical filter. A segment removed along radii which were displaced by an appropriate angle so that the removed segment equaled about 25% of the original area of the circular member. Thereafter the two radii edges which were created by severing the described segment were secured together in overlapping relation to define the conical filter having the desired apex angle and mouth opening. In addition to being a costly operation, the prior art method for forming such conical paper filters, required special blanking and cutting machinery which was relatively expensive.

It is an object of the present invention to provide conical paper filters which can be manufactured by utilizing conventional paper bag making machinery or which can be otherwise manufactured by utilizing conventional commercially available equipment.

It is also an object of the present invention to provide a conical paper filter which can be manufactured and sold at a relatively low price when compared with the relatively high price of the conical paper filters of the prior art.

It is an additional object of the present invention to provide a conical paper filter which has some of the advantages of a pleated side surface arrangement as well as those of unpleated form and which will nevertheless readily be adapted to fit a greater number of vacuum cleaners than the conical filters of the prior art.

In connection with the foregoing object it is a further object of the present invention to provide a conical paper filter in which the mouth of the filter can be distended to various sizes and which distention of the mouth is not limited as a result of the previously described radial relationship of the radial edges formed after the removal of the segment as in the prior art.

It is a still further object of the present invention to provide a conical filter of partially pleated type which results in the saving of paper as compared with the pleated type of prior art filter.

It is an added object of the present invention to provide a conical filter which is capable of an increased filtering action when compared with conical filters of the prior art.

Other and further objects and advantages of the present invention will be readily apparent to one skilled in the art from a consideration of the following specification taken in connection with the appended drawings.

In the drawings, which illustrate the best mode presently contemplated for carrying out this invention:

FIGURE 1 is a more or less diagrammatic illustration which shows the method utilized in forming an intermediate blank from which the conical filter of the present invention is formed;

FIGURE 2 is a perspective view showing the intermediate blank or member formed by the process illustrated in FIGURE 1;

FIGURE 3 is a side elevation showing the blank illustrated in FIGURE 2; after an additional processing step to which the blank has been subjected.

FIGURE 4 is an end view taken in the direction of arrow 4—4 in FIGURE 3;

FIGURE 5 is a view similar to FIGURE 3 and illustrates the conical filter which is formed from the intermediate unit illustrated in FIGURE 3, said filter being shown in the collapsed condition thereof;

FIGURE 6 is a perspective view of the conical filter according to the present invention; and FIGURE 7 is a bottom plan view of the filter.

Referring now to FIGURE 1 of the drawing in detail, there is shown a roll or supply of paper sheet material 10 from which the filter 12 of the present invention is formed. It will be understood that the sheet material 10 is of a type suitable to provide for proper filter action by said filter 12. The roll of paper 10 is passed through suitable conventional paper bag making machinery which is well known in the art and is first folded over upon itself by said machinery as shown at 14 and in addition to being folded over upon itself a plurality of pleats, folds or corrugations 16, which extend longitudinally of the sheet material 10 are formed therein at the folded over side thereof. Thereafter blanks 18 are cut from the folded over free end of the sheet material 10. It will be understood that all of these described operations may be performed preferably by paper bag making machinery.

As best shown in FIGURE 2 each blank 18 comprises a pair of complementary side walls 20 and 22 which are interconnected by the integral rear wall portion 24 which is provided with the previously mentioned pleats 16. It will be noted that each of the side walls 20 and 22 is provided with a fold line 26 which fold lines are in registry. It will also be noted that the lower marginal edge 28 of the side wall 20 extends below the lower marginal edge 30 of the side wall 22.

A suitable adhesive material is then applied to the outer surface to the side wall 22 along the fold line 26 thereof so as to completely cover said surface portion between the fold line 26 and the adjacent marginal edge 30, said adhesive also being applied to the inner surface portion 36 of side wall 20 which projects beyond the lower marginal edge 30 of the side wall portion 22. As a result there is obtained the intermediate unit 38 illustrated in FIGURE 3. It will be noted that in said intermediate unit 38 the bottom outer surface portion 34 of side wall 22 is secured to the side wall by the adhesive 32 and that the lower marginal edge portion 28 of the side wall 20 is also secured to the outer surface of the side wall 22 so that the unit 38 in addition to being closed by the pleated rear wall 24 thereof is also closed along its lower marginal edge which is now constituted by the fold line 26.

The intermediate unit 38 is now subjected to the final processing step to form the conical filter member 12. This is illustrated in FIGURE 5 and this step consists in subjecting the intermediate unit 38 to a cutting operation by any suitable cutting machine such as a steel rule die cutter so as to remove therefrom the portion indicated by broken line 40 in FIGURE 5. Portion 40 is cut away from the intermediate unit 38 by cutting along an arc 42 which constitutes a 90° portion of a circle. Said arc extending from a point 44 below the upper free end of the rear wall 24 to a point 46 inwardly of the free end of the fold line 26 which constitutes the lower marginal edge of the unit 38. The arc 42 is deformed in the cutting operation to provide the tabs or extensions 48 which consequently constitute ears by means of which conical filter 12 may be suitably releasably secured within a vacuum cleaner.

The conical filter unit 12 is illustrated in its open condition in FIGURES 6 and 7, it being noted that the unit is provided with a bottom apex or pointed end 50. The pleats 16 extend from said apex to the mouth 52 of the unit and the fold line 26 also extends upwardly from the apex to the mouth 52 of the unit.

The filter unit 12, being only partially provided with pleats 16 which do not extend throughout the entire surface thereof has many advantages over the prior art filter units which are either smooth or pleated throughout their entire peripheral surface. Since relatively few pleats 16 are utilized, the filter unit 12 can be formed out of a lesser amount of sheet material 10 so that there is a saving in this respect. In addition since the maximum portion of the surface of the unit 12 is not provided with pleats an increased filtering action can be obtained as the unit 12 will bear intimately against the opposing surface of the vacuum cleaner throughout the entire extent of the filter except for the limited area of the pleated portions 16. Furthermore, by retaining the pleats 16 in a relatively small portion thereof the filter 12 nevertheless has the advantages inherent in a pleated conical filter namely the retention thereof. Moreover, in this respect the filter 12 at the mouth 52 thereof can be extended so as to fit a greater number of different types of vacuum cleaners than is possible with filters of the prior art in view of the fact that the distention at the mouth of the filter is not limited to the previously described angular cutout which must be provided in the circular blank of which the prior art conical filters are formed. In the instant filter the apex angle may be conformed to the requirements of a wide variety of supporting structures of vacuum cleaning devices and is not limited by the initial apex angle as determined by a cut out segment.

While I have here shown and described a preferred embodiment of my invention, it will be apparent however that this invention is not limited to this embodiment and that many changes, additions and modifications can be made in connection therewith without departing from the spirit and scope of the invention as herein disclosed and hereinafter claimed. Having described my invention what I claim as new and desired to secure by Letters Patent is:

1. A conical filter element comprising a member having a pair of opposing substantially right triangular side walls and an end wall extending between said side walls, each of said side walls having a first marginal edge common with said end wall and a second marginal edge extending substantially normal to said first marginal edge thereof, said second marginal edges being folded over and secured to the outer surface of one of said side walls with both marginal edges having portions in contact with the said side wall, each of said side walls having a third arcuate marginal edge extending between the first and second marginal edges thereof, and said end wall having a plurality of pleats which extend in the direction of and between said first marginal edges.

2. A conical filter element comprising a member having a pair of opposing substantially right triangular side walls and an end wall extending between said side walls, each of said side walls having a first marginal edge common with said end wall and a second marginal edge extending substantially normal to said first marginal edge thereof, said second marginal edges being folded over and secured to the outer surface of one of said side walls with both marginal edges having portions in contact with the said side wall, each of said side walls having a third arcuate marginal edge extending between the first and second marginal edges thereof, and said end wall having a plurality of pleats which extend in the direction of and between said first marginal edges, and tab means provided on said arcuate edges.

References Cited by the Examiner

UNITED STATES PATENTS

| | | | |
|---|---|---|---|
| 1,107,347 | 8/14 | Powers. | |
| 1,154,185 | 9/15 | Hollis | 229—1.5 X |
| 2,171,484 | 8/39 | Squire | 210—497 |
| 2,296,359 | 9/42 | Martinet | 55—379 X |
| 2,656,897 | 10/53 | Yonkers | 55—373 X |
| 2,751,041 | 6/56 | Cropley | 55—381 X |

ROBERT F. BURNETT, *Primary Examiner.*

HARRY B. THORNTON, *Examiner.*